(12) United States Patent
Pedrido (10) Patent No.: US 8,132,429 B2
(45) Date of Patent: Mar. 13, 2012

(54) METHOD FOR FABRICATING AN OPTICAL FIBER, PREFORM FOR FABRICATING AN OPTICAL FIBER, OPTICAL FIBER AND APPARATUS

(75) Inventor: Carlos Pedrido, Boudry (CH)

(73) Assignee: Silitec Fibers SA, Boudry (CH)

( * ) Notice: Subject to any disclaimer, the term of this patent is extended or adjusted under 35 U.S.C. 154(b) by 945 days.

(21) Appl. No.: 11/568,307

(22) PCT Filed: Apr. 7, 2004

(86) PCT No.: PCT/CH2004/000261
§ 371 (c)(1),
(2), (4) Date: Mar. 23, 2007

(87) PCT Pub. No.: WO2005/102946
PCT Pub. Date: Nov. 3, 2005

(65) Prior Publication Data
US 2007/0214841 A1    Sep. 20, 2007

(51) Int. Cl.
*C03B 37/012* (2006.01)
*C03B 37/02* (2006.01)
(52) U.S. Cl. .......................... 65/412; 65/435
(58) Field of Classification Search .......... 65/412
See application file for complete search history.

(56) References Cited

U.S. PATENT DOCUMENTS

| | | | |
|---|---|---|---|
| 2,980,957 A * | 4/1961 | Hicks, Jr. ............... | 65/412 |
| 4,820,322 A | 4/1989 | Baumgart et al. | |
| 4,936,650 A * | 6/1990 | Ainslie et al. ............... | 385/141 |
| 6,047,568 A | 4/2000 | Campion | |
| 6,334,338 B1 | 1/2002 | Mandich et al. | |

(Continued)

FOREIGN PATENT DOCUMENTS

DE  39 21 489 A  1/1991

(Continued)

OTHER PUBLICATIONS

Kominsky, D. "Generation of random-hole optical fiber," Optics Letters vol. 28, No. 16 Aug. 15, 2003 pp. 1409-1410.*

(Continued)

*Primary Examiner* — Matthew Daniels
*Assistant Examiner* — Jodi C Franklin
(74) *Attorney, Agent, or Firm* — Oliff & Berridge, PLC (57) ABSTRACT

The method for fabricating an optical fiber comprises the steps of inserting a primary optical fiber preform (11) having a first primary axis (x1) and an outer surface (111) into an overcladding tube (12) having a second primary axis (x2) and an inner surface (120), so that said outer surface and inner surface define an interior space (15); holding the primary preform (11) in a centrally inserted position within the overcladding tube (12) with said first and second primary axes (x1, x2) in substantial alignment with each other; supplying overcladding grain (13) into the interior space (15) that is limited at the lower end of the overcladding tube (12) by means of a closure (125); generating a condition of reduced pressure within the interior space (15) that is limited at the upper end of the overcladding tube (12) by means of an adjoiner (3), which holds the primary optical fiber preform (11) and the overcladding tube (12) in position; and heating the unprocessed secondary preform (1), that consists of the primary preform (11), the overcladding tube (12) and the overcladding grain (13), at its lower end to a softened state and simultaneously or subsequently drawing an optical fiber therefrom.

16 Claims, 5 Drawing Sheets

U.S. PATENT DOCUMENTS

| | | | |
|---|---|---|---|
| 6,374,641 B1 * | 4/2002 | Chu et al. | 65/385 |
| 6,474,108 B2 * | 11/2002 | Onishi et al. | 65/397 |
| 6,519,974 B1 | 2/2003 | Oh et al. | |
| 6,626,011 B2 * | 9/2003 | Chiquet et al. | 65/388 |
| 7,072,552 B2 * | 7/2006 | Manyam et al. | 385/125 |
| 7,567,742 B2 * | 7/2009 | Pickrell et al. | 385/125 |
| 2005/0204780 A1 * | 9/2005 | Moridaira et al. | 65/407 |
| 2005/0226580 A1 * | 10/2005 | Samson et al. | 385/127 |
| 2007/0220924 A1 | 9/2007 | Pedrido | |

FOREIGN PATENT DOCUMENTS

| | | | |
|---|---|---|---|
| EP | 0 553 868 A | | 8/1993 |
| EP | 0 695 003 A | | 1/1996 |
| JP | 58 104031 A | | 6/1983 |
| JP | 58 151336 A | | 9/1983 |
| JP | 61 132535 A | | 6/1986 |
| JP | 09 124332 A | | 5/1997 |
| JP | 09124332 A | * | 5/1997 |
| WO | 03/093884 A | | 11/2003 |

OTHER PUBLICATIONS

Handbook of Photonics, Mool C. Gupta Editor in Chief, ISBN0-8493-8909-7 CRC Press, LLC. Boca Raton, FL, TA1520.H37 1996, pp. 445-449.

* cited by examiner

METHOD FOR FABRICATING AN OPTICAL FIBER, PREFORM FOR FABRICATING AN OPTICAL FIBER, OPTICAL FIBER AND APPARATUS

The present invention relates to a method and an apparatus for fabricating an optical fiber and to a preform used for fabricating an optical fiber as well as to optical fiber fabricated according to said method.

Fabrication of optical fibers, such as the fibers currently used in ultra high speed data communication networks, is described in [1], Mool C. Gupta, Handbook of PHOTONICS, CRC Press, 1997 Boca Raton, chapter 10.7, pages 445-449. Main process steps of optical fiber fabrication are fabricating a glass blank (below called preform), drawing the fiber from the preform and coating the fiber with a material that protects the fiber from handling and from environmental influences.

According to [1], there are basically three methods to form the preform. The modified chemical vapor deposition process (MCVD), the outside vapor deposition process (OVD) and the vapor axial deposition process (VAD).

In the drawing process, the preform is fed from above into the drawing portion of the furnace while being drawn from the bottom using tractors. The fiber is then wound onto a drum while being monitored for tensile strength. The temperature during draw is on the border of 2000° C. After exiting the furnace the fiber is coated with a UV-curable coating before winding on the drum.

As described in [2], U.S. Pat. No. 6,519,974B1, the MCVD method has certain advantages over the other methods. In the MCVD process, successive layer of SiO2 and dopants, which include Germanium, phosphorous and fluorine, are deposited on the inside of a fused silica tube by mixing the chloride vapors and oxygen at a temperature in the order of 1800° C. In the layer deposition process the cladding layers are laid down first, and then the layers that will form the core are deposited. After deposition of the layers, the internally layered quartz tube is heated in the presence of Cl2 and He so as to form a compact quartz rod.

As further stated in [2], the MCVD method, used by itself, has the inherent limitation that it is not suitable to make preforms of more than 25 mm in diameter. In order to overcome this limitation, MCVD is often practiced with a so-called overcladding method, which allows fabrication of relatively large preforms and thus improves productivity for the fiber fabrication process. Conventional overcladding involves, in general terms, placing a rod preform inside a tube made of a suitable overcladding material, fusing the rod and tube together to form a secondary preform, and drawing from the secondary preform an optical fiber comprising a core enclosed within a cladding layer. Thus, a high productivity implementation of the MCVD method requires three essential steps: preparing a primary optical fiber preform by internal deposition, overcladding the primary optical fiber preform to obtain a secondary optical fiber preform, and finally drawing an optical fiber from the secondary optical fiber preform.

In [2], it has been found that carrying out these three steps separately requires
a) substantial amounts of time and consequently has a negative effect on productivity;
b) a large amount of oxygen or hydrogen for the step of overcladding the primary optical fiber preform; and
c) application of a relatively large amount of heat for the overcladding step, if the primary optical fiber preform is relatively large.

To overcome these disadvantages a combination of the overcladding and drawing steps was proposed e.g. in [3], U.S. Pat. No. 2,980,957. The method disclosed in [3] comprises the steps of creating between a core rod and a thereto concentrically arranged overcladding tube a high vacuum prior to the drawing stage and further a controlled low vacuum in order to controllably counteract the drawing forces and cause the tubular member to progressively collapse into the space between the core rod and the overcladding tube. One problem in combining the fusing and drawing stages has been to control the application of vacuum with sufficient precision that the finished optical fiber has sufficient strength and optical quality for modern communications applications.

Another aspect addressed in [2] is the proper alignment of the core rod and the overcladding tube. A method has been disclosed in [4], U.S. Pat. No. 4,820,322, that allows the fabrication of a strong fiber with concentric core and cladding, that uses a vacuum to promote collapse of the overcladding tube, and that can be practiced either in a separate manufacturing phase or in a continuous process combined with drawing of the fiber. As stated in [2] the approach disclosed in [4] has a limit on the gap between the rod and the overcladding tube; the tube inside diameter cannot exceed the rod diameter by more than a certain amount. Furthermore, the embodiment combining collapsing the tube and drawing the fiber does not use an affirmative means to center the rod in the tube, relying instead for concentricity on inherent self centering forces thought to be present as the fiber is drawn from the tip of the rod-and-tube preform.

To improve the techniques described above a method has been proposed in [2] that allows drawing of an optical fiber from a rod-and-tube preform while simultaneously fusing the rod and the overcladding tube. This rod-in-tube approach employs a low intensity vacuum source that permits fine adjustment of the differential pressure. It also provides for controlled alignment of the core rod and the overcladding tube to ensure that the desired circumferential uniformity of the cladding layer in the drawn fiber is achieved. The low intensity vacuum is achieved by introducing a flow of gas into an adjoiner that holds a primary optical fiber preform having a first primary axis and an outer surface and an overcladding tube having a second primary axis and an inner surface defining an interior space, coaxially aligned together as a secondary preform assembly. The flow of gas through a channel in the adjoiner generates a condition of reduced pressure in accordance with Bernoulli's theorem, and therefore partially evacuates the space between the overcladding tube and the primary optical fiber preform. The flow rate through channel will determine the extent to which the gas pressure in the space is reduced.

According to [2], the main concern with the realization of rod in-tube processes is focused on alignment procedures and the application of a precisely controlled vacuum. However, besides these known main concerns, costs for the production of high quality optical fiber from a rod-and-tube preform are a continuous concern.

It would therefore be desirable to provide an improved method and an apparatus that allow fabricating high quality optical fiber from a rod-and-tube preform.

It would be desirable in particular to provide a method that allows fabricating high quality optical fiber from a rod-and-tube preform at significantly reduced cost.

Still further it would be desirable to provide a method that allows a reduction of the requirement of precision in alignment of rod and tube of the rod-and-tube preform as well as a reduction of the requirement of precision for controlling the vacuum for sequential or simultaneous preform fusing and fiber drawing.

It would further be desirable to create a rod-and-tube preform, that can be used with the inventive method, as well as high quality optical fiber drawn from said rod-and-tube preform.

It would further be desirable to create a rod-and-tube preform that allows modification of the properties of the optical fiber drawn from said rod-and-tube preform with reduced effort.

SUMMARY OF THE INVENTION

The above and other objects of the present invention are achieved by a method according to claim 1, a secondary preform according to claim 6, an optical fiber according to claim 9 and an apparatus according to claim 10.

The method for fabricating an optical fiber comprises the steps of:

inserting a primary optical fiber preform having a first primary axis and an outer surface into an overcladding tube having a second primary axis and an inner surface, so that said outer surface and inner surface define an interior space;

holding the primary preform in a centrally inserted position within the overcladding tube with said first and second primary axes in substantial alignment with each other;

supplying overcladding grain into the interior space that is limited at the lower end of the overcladding tube by means of a closure;

generating a condition of reduced pressure within the interior space that is limited at the upper end of the overcladding tube by means of an adjoiner, which holds the primary optical fiber preform and the overcladding tube in position; and heating, by means of a furnace preferably in the range of 2100° C. to 2250° C., the unprocessed secondary preform, that consists of the primary preform, the overcladding tube and the overcladding grain, at its lower end to a softened state and simultaneously drawing an optical fiber therefrom or heating, by means of a furnace, the unprocessed secondary preform, that consists of the primary preform, the overcladding tube and the overcladding grain, substantially over its entire length in order to obtain a processed secondary preform, from which an optical fiber is drawn in a subsequent process stage.

Due to the thermal energy provided by the furnace and due to the established difference of pressures that are present in and outside the secondary preform, the overcladding tube will collapse and press the molten overcladding grain onto the primary preform.

The overcladding material of the overcladding tube and the overcladding grain will form a practically homogeneous layer that adjoins the primary preform in the same manner as the thick overcladding tube does, when it collapses, in conventional rod-and-tube applications, as described for example in [2].

Fusing of the secondary preform and fiber drawing can be performed simultaneously as with the method described in [2]. However the unprocessed secondary preform can also be processed in a preliminary process stage in order to obtain a processed secondary preform from which an optical fiber can be drawn in a subsequent process stage at the present or another process site.

The present invention however yields numerous advantages over the prior art mentioned above:

The known method of producing a secondary preform by sleeving an overcladding tube with thick walls over a primary preform is abandoned. Instead an overcladding tube with thin walls is used and the interior space between the primary preform and the inner surface of the overcladding tube is filled with silica grain. Consequently the effort and costs for the production of the overcladding preform with thick walls are avoided. Instead of a costly silica tube with thick walls, silica grain can be used.

Due to the mobility of the overcladding grain, the interior space or gap between the outer surface of the primary preform and the inner surface of the overcladding tube is evenly filled with the silica grain, so that a misalignment between the primary preform and the overcladding tube. Besides the elimination of alignment problems the control of the pressure reduction is less critical, since the overcladding tube is not collapsing uncontrolled into a free gap but pressing steadily onto the supporting grain.

The inner diameter of the thin walled overcladding tube is preferably selected at least 1.5 times larger than the outer diameter of the primary preform and more than 10 times larger than its wall diameter. However, in practice any dimensions can be realized, that are supported by the mechanical strength of the related elements.

Further the overcladding tube is preferably supplied with a conically formed closure at its lower end, so that the walls of the overcladding tube and the primary preform meet at their lower end and silica grain can be filled into the interior space. Since the primary preform in a preferred embodiment also comprises a conical form at its lower end, the alignment procedures are significantly facilitated.

The overcladding grain, which consists of particles with a small diameter, e.g. a powder, is inserted into the interior space before the adjoiner is mounted or after the adjoiner is mounted, through a channel provided therein.

The overcladding grain may be a pure or doped synthetic silica powder that may be selected according to the desired properties of the fabricated fiber. A method of manufacturing a silica powder using a solgel technique is described in [6], U.S. Pat. No. 6,047,568. Further solgel techniques, for achieving higher drawing forces and reducing breakage risks during the drawing process are described in [7], U.S. Pat. No. 6,334,338. Hence the inventive method also provides a high flexibility that allows meeting the customer's demands within short notice.

BRIEF DESCRIPTION OF THE DRAWINGS

Some of the objects and advantages of the present invention have been stated, others will appear when the following description is considered together with the accompanying drawings, in which.

DETAILED DESCRIPTION OF THE PREFERRED EMBODIMENTS

Figure 1:
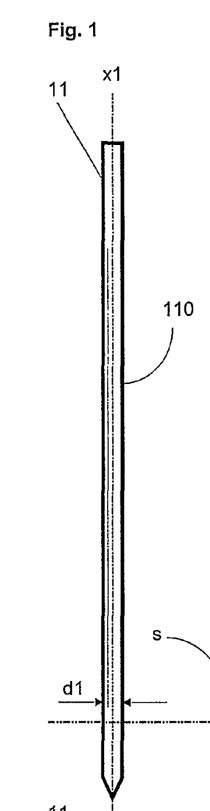
FIG. 1 shows a primary preform 11 having a first primary axis x1.
Figure 1A:
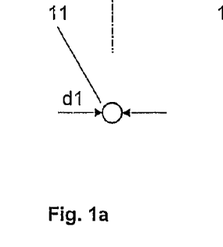

FIG. 1 shows a primary preform 11 having a first primary axis x1, an outer diameter d1 and an outer surface 111. Manufacturing of such a preform has been described above.

Figure 2:
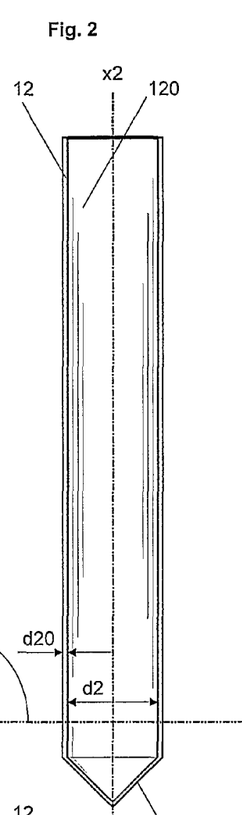
FIG. 2 shows a thin walled silica tube 12, having a first primary axis x2, with a conical closure 125 at its lower end that, according to the inventive method, is used as overcladding tube 12.
Figure 2A:
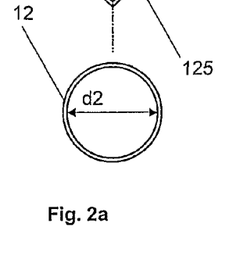

FIG. 2 shows a thin walled silica tube 12, having a first primary axis x2, an inner diameter d2, a wall thickness d20 and an inner surface 120. The thin walled silica tube 12, which comprises a conical closure 125 at its lower end, is used according to the inventive method as overcladding tube 12. Silica tubes of this kind are available from several manufacturers.

Figure 3:
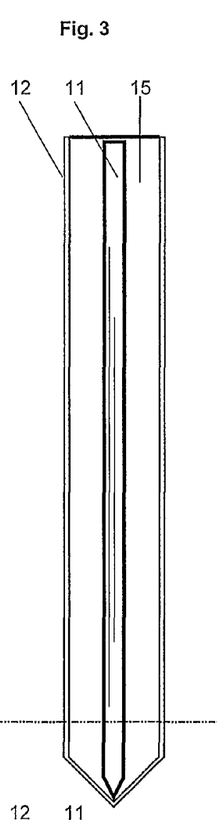
FIG. 3 shows the primary preform 11 held in a centrally inserted position within the overcladding tube 12 with said first and second primary axes x1, x2 in substantial alignment with each other.
Figures 3A, 4A:
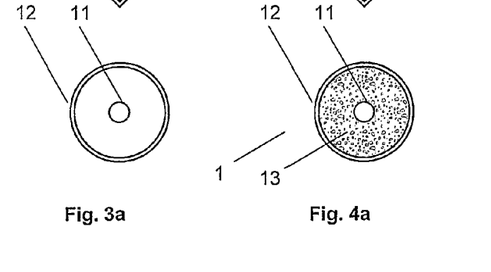
FIG. 4 shows an unprocessed secondary preform 1 with the primary preform 11 and the overcladding tube 12 of FIG. 3 with an interior space 15, that is defined by the outer surface 111 of the primary preform 11 and inner surface 120 of the overcladding tube 12, filled with overcladding grain 13.

FIG. 3 shows the primary preform 11 held in a centrally inserted position within the overcladding tube 12 with said first and second primary axes x1, x2 in substantial alignment with each other.

The thickness d20 of the circular wall of the overcladding tube 12 is for example ten times smaller than its inner diameter d2. However the ratio of said diameter/thickness d2/d20 may be up to 50 and higher. The ratio d2/d1 of the inner diameter d2 of the overcladding tube 12 and the outer diameter d1 of the primary preform 11 is for example in the range of 1.5 up to 5 and more.

Hence, the volume of the interior space 15, that is defined by the outer surface 111 of the primary preform 11 and inner surface 120 of the overcladding tube 12 is relatively large, i.e., several times larger than the volume of the primary preform 11.

Figure 4:
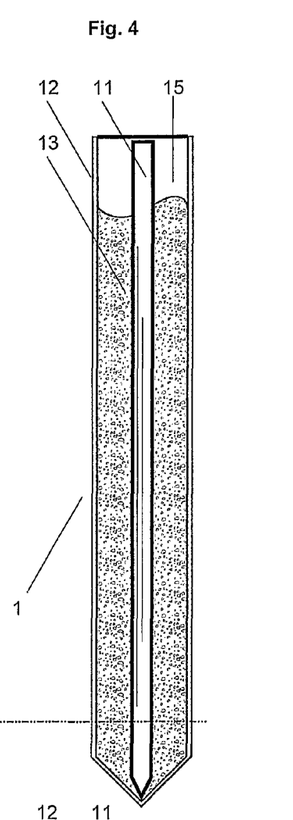

FIG. 4 shows an unprocessed secondary preform 1 with the primary preform 11 and the overcladding tube 12 of FIG. 3 with the interior space 15 filled with overcladding grain 13, a pure or doped synthetic silica grain or powder, that is selected according to the desired properties of the fiber during the drawing process or in view of its later performance.

FIGS. 1a, 2a, 3a and 4a show crosssections of the primary preform 11, the overcladding tube 12 and the overcladding grain 13 along line s in FIGS. 1 to 4.

Figures 5, 6:
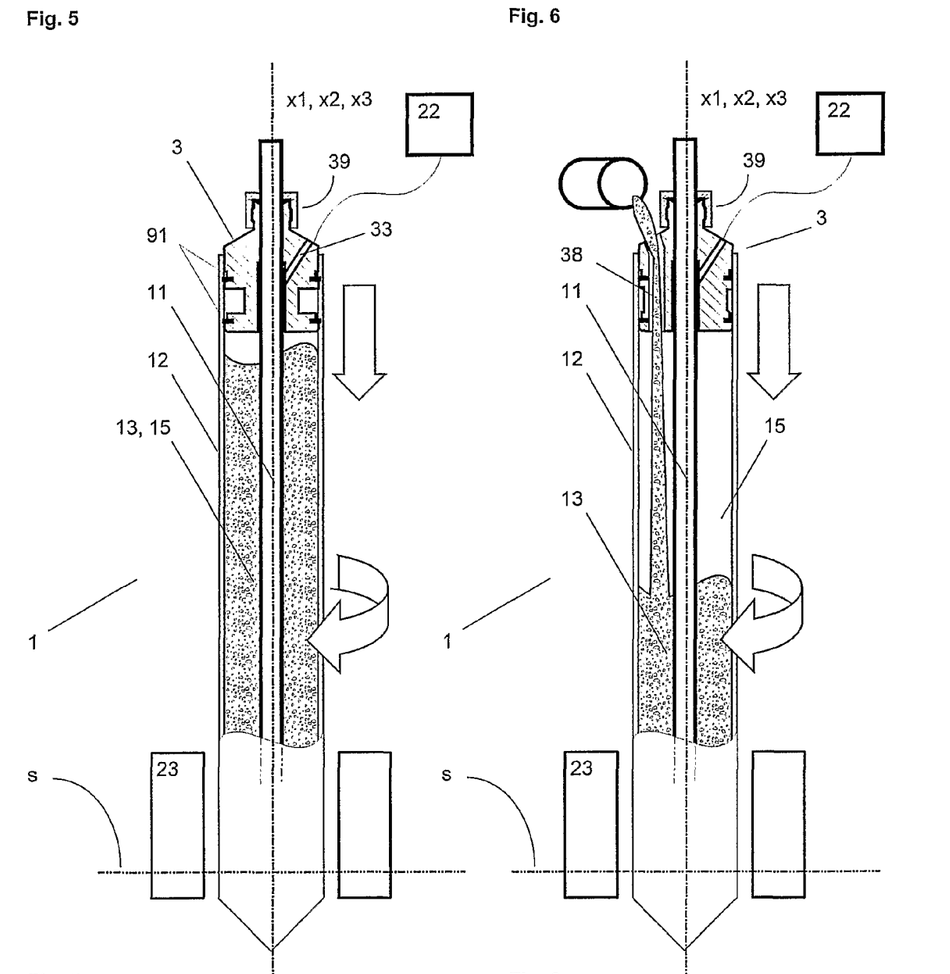
FIG. 5 shows the secondary preform 1 of FIG. 4 with an adjoiner 3 partially inserted into the overcladding tube 12, holding the primary preform 11 in centralized position and closing and sealing the interior space 1 on its upper side.
FIG. 6 shows a secondary preform 1 with an adjoiner 3 that allows insertion of overcladding grain 13 through a channel 38.

FIG. 5 shows the secondary preform 1 of FIG. 4 with an adjoiner 3 inserted into the overcladding tube 12, holding the primary preform 11 in centralized position and closing and sealing the interior space 1 on the upper side. In this embodiment of the invention the overcladding grain 13 had been inserted into the interior space 15 before the adjoiner 3 has been mounted.

FIG. 6 shows the primary preform 11 and the overcladding tube 12 aligned and covered by means of an adjoiner 3, that comprises a channel 38, through which the overcladding grain 13 can be inserted.

The adjoiners 3 shown in FIGS. 5 and 6, which have a first primary axis x3, further comprise evacuation channels 32, 33 through which, by means of a vacuum pump 22, the secondary preform 1, that is filled with overcladding grain 13, can be evacuated.

Figure 5A:
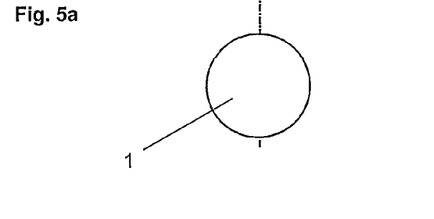
Figure 6A:
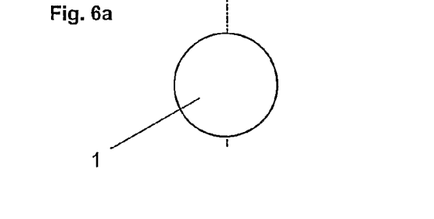

FIGS. 5 and 6 further show a heat supply or furnace 23, which allows heating of the secondary preform 1 at its lower end for example to temperatures in the range of to 2100° C. to 2350° C. Due to the thermal energy provided by the furnace 23 and due to the established difference of pressures that are present in and outside the secondary preform 1, the overcladding tube 12 will collapse and press the molten overcladding grain 13 onto the primary preform 11. Thus, the overcladding material of the overcladding tube 12 and the overcladding grain 13 will form a practically homogeneous layer that adjoins the primary preform. FIGS. 5a and 6a symbolically show a crosssection of the secondary preform 1 after performing the melting process.

Fusing of the secondary preform 1 and fiber drawing can be performed simultaneously. However it is also possible to process the secondary preform 1 completely before the fiber is drawn.

FIG. 6 shows in a sectional view of the upper end of secondary preform 1 of FIG. 5 in detail. The adjoiner 3, which is inserted into the overcladding tube 12, comprises two peripheral circular grooves with sealing elements, e.g. o-rings, that tightly adjoin and seal the inner surface 120 of the overcladding tube 12 so that the interior space 15 that is limited by the adjoiner 3, the outer surface 111 of the primary preform 11 and the inner surface 120 of the overcladding tube 12 and its closure 125 at the lower end can be evacuated. The evacuation can be performed through evacuation channels 32 and 33 provided in the adjoiner 3 and through a tube 220 that connects the adjoiner 3 with the vacuum pump 22. The tube 220 is connected to the adjoiner 3 by means of a valve 221 that can be closed after the evacuation process has been performed. Instead, for generating a condition of reduced pressure, a gas could be supplied to a corresponding channel in the adjoiner 3, as described in [2].

Figure 7:
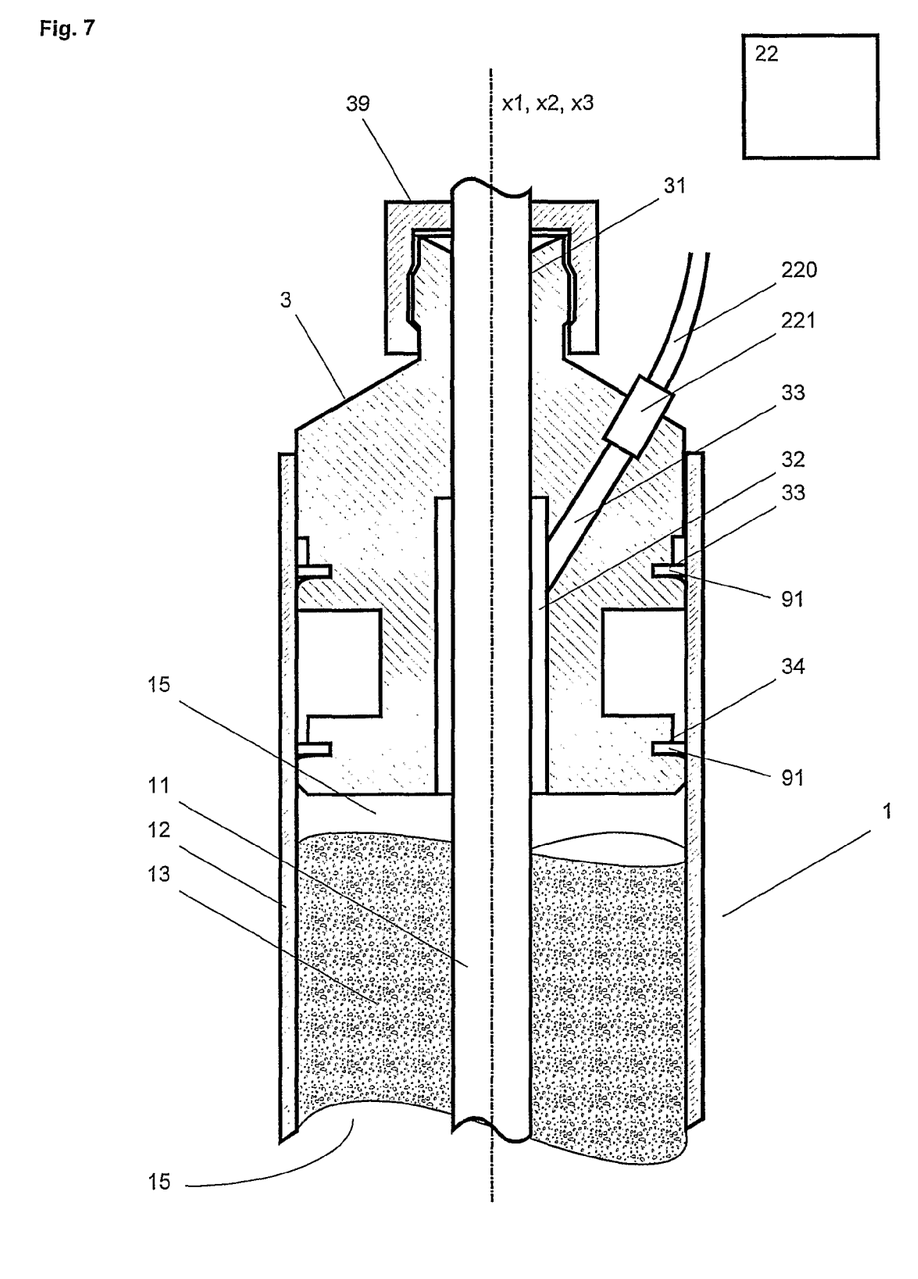
FIG. 7 shows the upper end of secondary preform 1 of FIG. 5 in detail.
Figure 8:
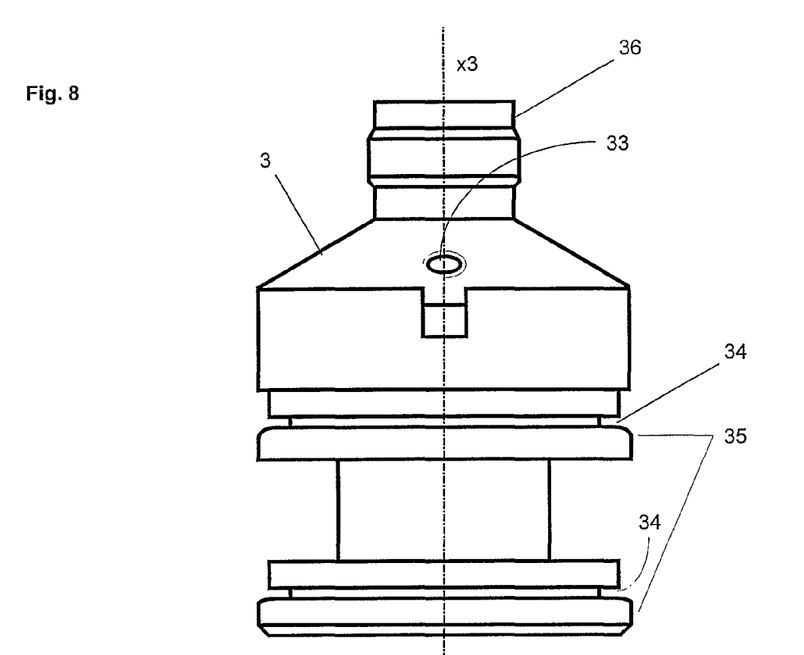
FIG. 8 shows the adjoiner 3 used for the secondary preform 1 of FIG. 4.
Figure 9:
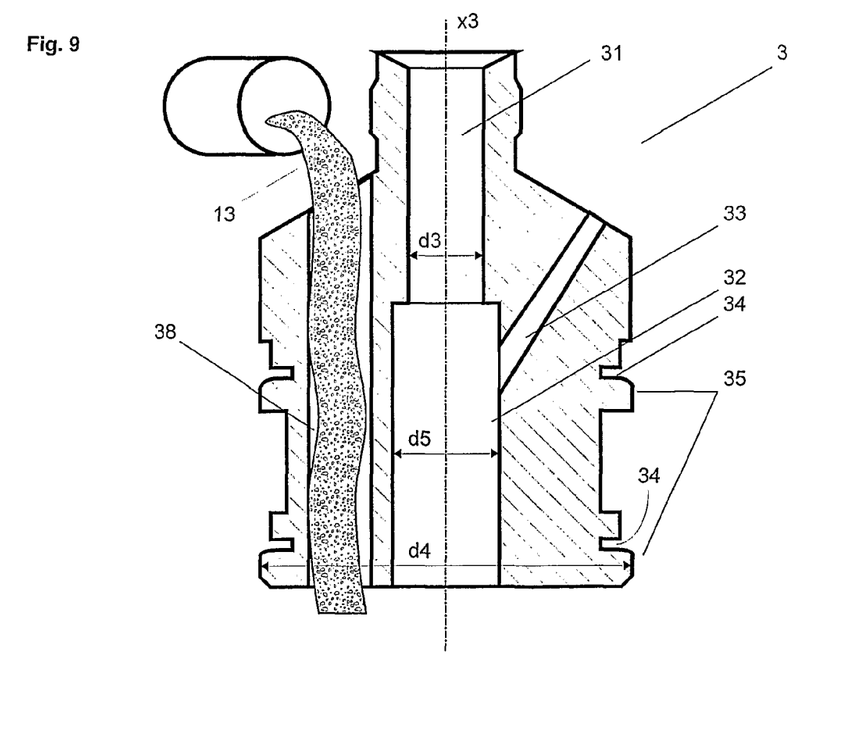
FIG. 9 shows a sectional view of the adjoiner 3 of FIG. 6, with the channel 38 provided for the insertion of overcladding grain 13.

The adjoiner 3 shown in FIGS. 7 to 9 further comprises, coaxially aligned with the first primary axis x3, a cylindrical opening 31 with a diameter d3 that corresponds to the outer diameter d1 of the primary preform 11 and, coaxially aligned with the first primary axis x3, two cylindrical segments 35 with a diameter d4 that corresponds to the inner diameter d2 of the overcladding tube 12. The adjoiner 3 can therefore be inserted into the cladding tube 12 so that the cylindrical segments 35 adjoin the inner surface 120 of the overcladding tube 12 and the primary preform 11 is inserted into the cylindrical opening 31 which leads to an end piece 36 that either is closed or can be closed by means of a sealing cap 39.

For sealing the adjoiner towards the inner surface 120 of the overcladding tube 12, two grooves, adjoining the cylindrical segments 35, are provided, in which sealing elements 91 are inserted.

FIG. 8 shows the adjoiner 3 used for the secondary preform 1 of FIG. 4 and FIG. 9 shows a sectional view of the adjoiner 3 of FIG. 7, with the channel 38 provided for the insertion of overcladding grain 13. In FIG. 9 it is further shown that the first evacuation channel 32 is arranged concentrically to the primary axis x3 of the adjoiner 3 with a diameter d5 that is significantly larger than the diameter d3 of the adjoining cylindrical opening 31.

Figure 10:
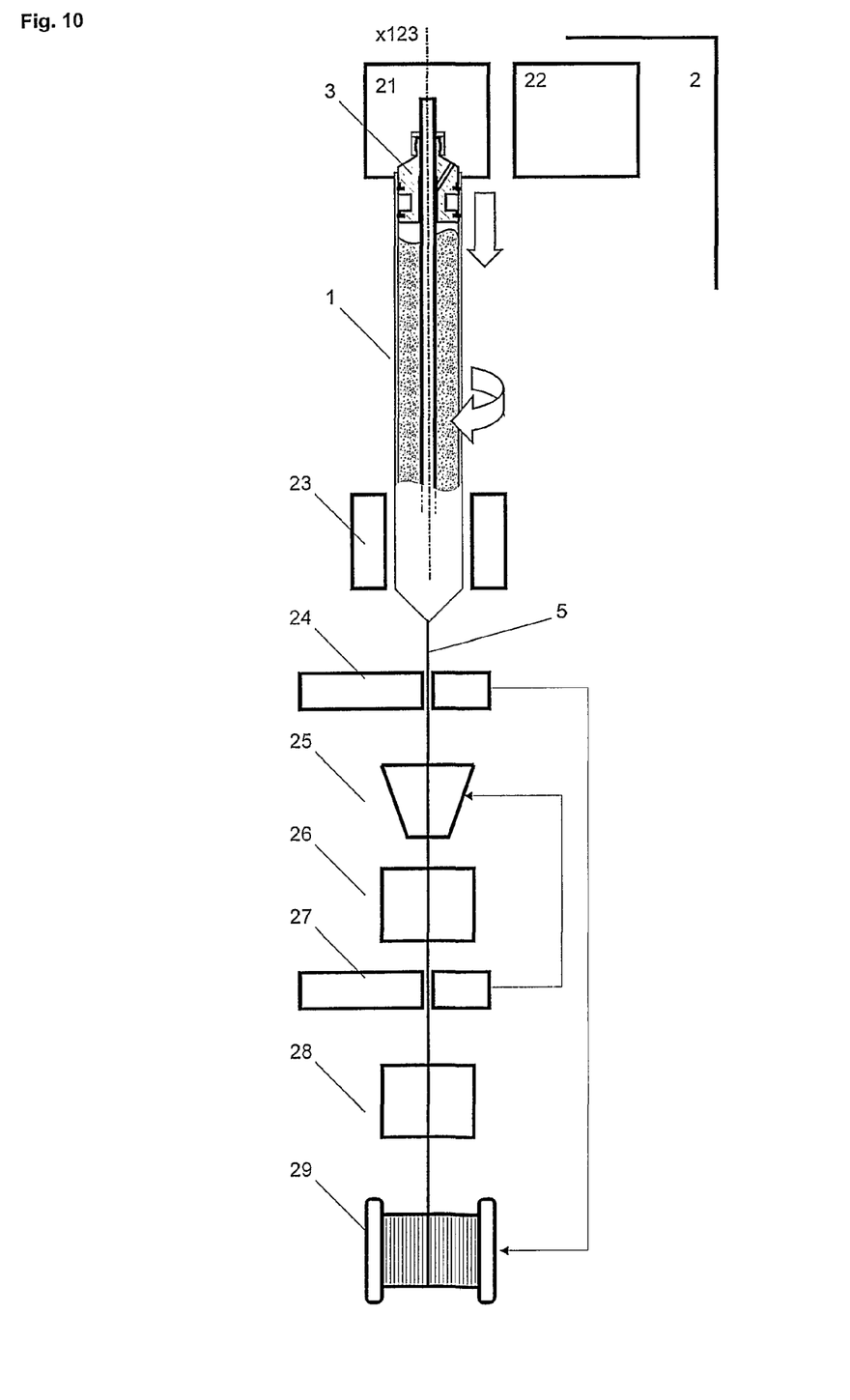
FIG. 10 shows an apparatus used for drawing an optical fiber from the secondary preform 1 of FIG. 5.

FIG. 10 shows an apparatus used for drawing an optical fiber 5 from the secondary preform 1 of FIG. 5. Once the secondary preform 1 is heated to its melting point and a fiber 5 has been pulled, an angular area called the neckdown is formed. A single optical fiber 5 emerges from the preform in a semi-molten state and passes through a diameter monitor 24. The optical fiber 5 continues to be pulled downward and passes through a coating applicator 25 that applies a coating to protect the optical fiber 5. The optical fiber 5 also passes through other units 26, 27 that cure the optical coating and monitor the overall diameter after the coating has been applied. The optical fiber 5 than encounters a spinning apparatus 28 which may comprise a roller that imparts a spin into the optical fiber. The optical fiber 25 then eventually encounters a series of rollers (not shown) pulling the fiber before the optical fiber is then wrapped around a drum or spool 29. The secondary preform 1 is mounted in a holding device 21, which allows controlled vertical movement along and preferably rotation around its axis x123. Furthermore the holding device 21 may be designed to apply a vibration onto the secondary preform in order to condense the overcladding grain 13 provided in the interior space 15.

What has been described above is merely illustrative of the application of the principles of the present invention. Other arrangements can be implemented by those skilled in the art without departing from the spirit and scope of protection of the present invention. Dimensions of the primary preform 11 and the overcladding tube 12 can be selected in a wide range as well as the granularity of the overcladding grain or powder 13. It is important to note that the dimensions are not limited to the examples defined above. Materials are selected according to the manufacturing parameters and properties desired for the fabricated optical fiber. The channels and openings 31, 32, 33, 38 and sealing means 34, 39, 91 for the adjoiner 3 can be designed in various ways. The closure 125 at the lower end of the overcladding tube 12 can have forms that significantly differ from a conical form. However the closure 125 and the lower end of the primary preform are preferably matched in order to facilitate alignment. Conditions for drawing a fiber can be applied and optimised in a known manner (see e.g. [5], EP 1 384 700 A1), so that optimal operating parameters, such as furnace temperature and drawing speed, can be found. Hence, such operating parameters are not limited by values mentioned above.

REFERENCES

[1] Mool C. Gupta, Handbook of PHOTONICS, CRC Press, 1997 Boca Raton, chapter 10.7, pages 445-449
[2] U.S. Pat. No. 6,519,974 B1
[3] U.S. Pat. No. 2,980,957
[4] U.S. Pat. No. 4,820,322
[5] EP 1 384 700 A1
[6] U.S. Pat. No. 6,047,568
[7] U.S. Pat. No. 6,334,338

The invention claimed is:

1. A method for fabricating a secondary processed optical fiber preform, comprising the steps of:
inserting a primary optical fiber preform having an outer surface into a thin-walled, elongated overcladding tube having an inner surface, wherein the outer surface and the inner surface define an interior space limited at a first end of the thin-walled, elongated overcladding tube by a conically formed closure;
holding the primary optical fiber preform in a substantially longitudinally coaxial relationship with the thin-walled, elongated overcladding tube;
supplying solely overcladding grain into the interior space, wherein the overcladding grain is a homogeneous crystalline silica grain that is selected from the group consisting of pure or doped synthetic silica powder;
forming an unprocessed secondary preform, wherein said unprocessed secondary preform comprises; the primary optical fiber preform, the thin-walled, elongated overcladding tube, the conically formed closure, and overcladding grain,
limiting the interior space at a second end of the overcladding tube by an adjoiner;
generating a reduced pressure within the interior space; and
heating at least a portion of the unprocessed secondary preform in order to transform at least the heated portion to a processed secondary preform from which an optical fiber can be drawn.

2. The method according to claim 1, wherein the inner diameter of the thin-walled, elongated overcladding tube is at least 1.5 times larger than the outer diameter of the primary optical fiber preform and more than 10 times larger than the wall thickness of the thin-walled, elongated overcladding tube.

3. The method according to claim 1, wherein the overcladding grain, which consists of particles with a smaller diameter, is inserted after the adjoiner is mounted, through a channel provided therein.

4. The method according to claim 1, wherein the temperature for heating at least a portion of the unprocessed secondary preform, is selected in the range of 2100° C. to 2350° C.

5. The method according to claim 1, wherein the unprocessed secondary preform is heated over its entire length in order to obtain a processed secondary preform.

6. The method according to claim 1, further comprising sealing the interior space with the adjoiner, the adjoiner having a first hollow cylindrical portion and a second hollow cylindrical portion, the first hollow cylindrical portion and second hollow cylindrical portion both having an outer diameter that corresponds to an inner diameter of the overcladding tube, the first cylindrical portion having an inner diameter that is larger than an inner diameter of the second cylindrical portion.

7. A secondary preform for fabricating an optical fiber comprising;
an elongated primary optical preform with an outer surface and an elongated overcladding tube wherein the primary optical preform is disposed coaxially within the elongated overcladding tube,
said elongated overcladding tube having an inner surface and a conical closure at a first end thereof,
wherein the conical closure, the outer surface, and the inner surface define an interior space that is filled solely with overcladding grain, wherein the overcladding grain is a homogeneous crystalline silica grain that is selected from the group consisting of pure or doped synthetic silica powder.

8. A secondary preform according to claim 7, wherein the elongated primary optical preform and the elongated overcladding tube are held and sealed at a second end of the elongated overcladding tube by an adjoiner comprising:
an opening coaxially aligned with the primary optical preform, the opening having a diameter to generally fit the outer diameter of the elongated primary optical preform,
at least one cylindrical element coaxially aligned with the elongated primary optical perform, and a sealing element with a diameter to generally fit the diameter of the elongated overcladding tube, and
an evacuation channel that is connectable to a vacuum pump or to a gas supply.

9. A secondary preform according to claim 8, wherein the adjoiner further comprises at least one channel for inserting the overcladding grain into the interior space.

10. A secondary preform according to claim 7, wherein the overcladding grain is molten.

11. The secondary preform according to claim 7, further comprising an adjoiner that seals the elongated overcladding tube, the adjoiner having a first hollow cylindrical portion and a second hollow cylindrical portion, the first hollow cylindrical portion and second hollow cylindrical portion both having an outer diameter that corresponds to an inner diameter of the overcladding tube, the first cylindrical portion having an inner diameter that is larger than an inner diameter of the second cylindrical portion.

12. A method for fabricating an optical fiber, comprising the steps of:
inserting a primary optical fiber preform having an outer surface into a thin-walled, elongated overcladding tube having an inner surface, wherein the outer surface and the inner surface define an interior space limited at a first end of the overcladding tube by a conically formed closure;
holding the primary optical fiber preform in a substantially longitudinally coaxial relationship with the elongated overcladding tube;
supplying solely overcladding grain into the interior space, wherein the overcladding grain is a homogeneous crystalline silica grain that is selected from the group consisting of pure or doped synthetic silica powder;
forming an unprocessed secondary preform, wherein said unprocessed secondary preform comprises; the primary optical fiber preform, the thin-walled, elongated overcladding tube, the conically formed closure, and overcladding grain,
limiting the interior space at the second end of the elongated overcladding tube by an adjoiner;
generating a reduced pressure within the interior space;
heating at least the bottom portion of the unprocessed secondary preform; and,
drawing an optical fiber from a bottom portion of the unprocessed secondary preform simultaneously with the step of heating.

13. The method according to claim 12, wherein the inner diameter of the elongated overcladding tube is at least 1.5 times larger than the outer diameter of the primary optical fiber preform and more than 10 times larger than the wall thickness of the elongated overcladding tube.

14. The method according to claim 12, wherein the overcladding grain is inserted after the adjoiner is mounted, through a channel provided therein.

15. The method according to claim 12, wherein the temperature for heating at least the bottom portion of the unprocessed secondary preform, is selected in the range of 2100° C. to 2350° C.

16. The method according to claim 12, further comprising sealing the interior space with the adjoiner, the adjoiner having a first hollow cylindrical portion and a second hollow cylindrical portion, the first hollow cylindrical portion and second hollow cylindrical portion both having an outer diameter that corresponds to an inner diameter of the overcladding tube, the first cylindrical portion having an inner diameter that is larger than an inner diameter of the second cylindrical portion.

* * * * *